(12) United States Patent
Ohshio et al.

(10) Patent No.: US 6,286,985 B1
(45) Date of Patent: Sep. 11, 2001

(54) VEHICLE HEADLAMP

(75) Inventors: Hirohiko Ohshio; Michio Tsukamoto; Michihiko Hayakawa, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/480,490

(22) Filed: Jan. 11, 2000

(30) Foreign Application Priority Data

Jan. 13, 1999 (JP) .................................................. 11-006018

(51) Int. Cl.$^7$ ............................. F21V 17/02; F21V 14/08
(52) U.S. Cl. ........................... 362/512; 362/284; 362/324
(58) Field of Search .................................... 362/512, 513, 362/282, 284, 322, 324

(56) References Cited

U.S. PATENT DOCUMENTS

| 1,834,542 | * | 12/1931 | Karlebo ................................. 362/513 |
| 4,951,178 | | 8/1990 | Shirai et al. ........................... 362/512 |
| 4,987,521 | | 1/1991 | Fratty et al. ........................... 362/512 |
| 5,213,406 | * | 5/1993 | Neumann et al. .................... 362/512 |
| 5,488,549 | | 1/1996 | Sato et al. ............................. 362/466 |
| 5,528,475 | | 6/1996 | Takahashi et al. ................... 362/467 |
| 5,899,559 | * | 5/1999 | Lachmayer et al. ................. 362/513 |
| 6,059,435 | * | 5/2000 | Hamm et al. ......................... 362/512 |

FOREIGN PATENT DOCUMENTS

| 1175867 | 1/1970 | (GB) . |
| 2 123 541 A | 2/1984 | (GB) . |

* cited by examiner

*Primary Examiner*—Alan Cariaso
(74) *Attorney, Agent, or Firm*—Sughrue, Mion, Zinn, Macpeak & Seas, PLLC (57) ABSTRACT

A vehicle headlamp comprising a light source bulb, a reflector, a shade, a beam switching device, and a displacement regulating member. The reflector includes a reflective surface for emitting a predetermined beam forward by reflecting light from said light source bulb. The shade is for shading part of light incident on the reflective surface from said light source bulb. The beam switching device selectively switches beams between low and high beams by moving said shade between two positions where the amount of shielding said shade relative to light incident on said reflective surface has different values. The displacement regulating member regulating the displacement of said shade from one of low- and high-beam forming positions by making contact with said shade while said shade is located in the one of the low- and high-beam forming positions.

16 Claims, 8 Drawing Sheets

VEHICLE HEADLAMP

BACKGROUND OF THE INVENTION

1. Field of the Invention

This invention relates to a vehicle headlamp arranged so as to switch beams between low and high beams by moving a shade.

2. Description of the Related Art

Vehicle headlamps are normally designed to send out low and high beams by making a reflector reflect light from a light source bulb forward. However, a difference in the light distribution pattern between the low and high beams required has made it customary to employ different light sources (discharge light emitting parts or filaments). However, vehicle headlamps using a single light source are also well known; in the case of a two-lamp type headlamp using a discharge bulb as a light source in particular, the single light source will have to be used very often.

In such a vehicle headlamp using a single light source, switching between low and high beams is conducted by the mechanical displacement of an optical element such as a light source, a reflector, a shade or the like. With respect to the vehicle headlamp shown in FIG. 8 in which beam switching is conducted by moving a shade, for example, a known arrangement is to longitudinally pivot a shade 2 around a longitudinal axis extending in the lateral direction.

Figure 8:
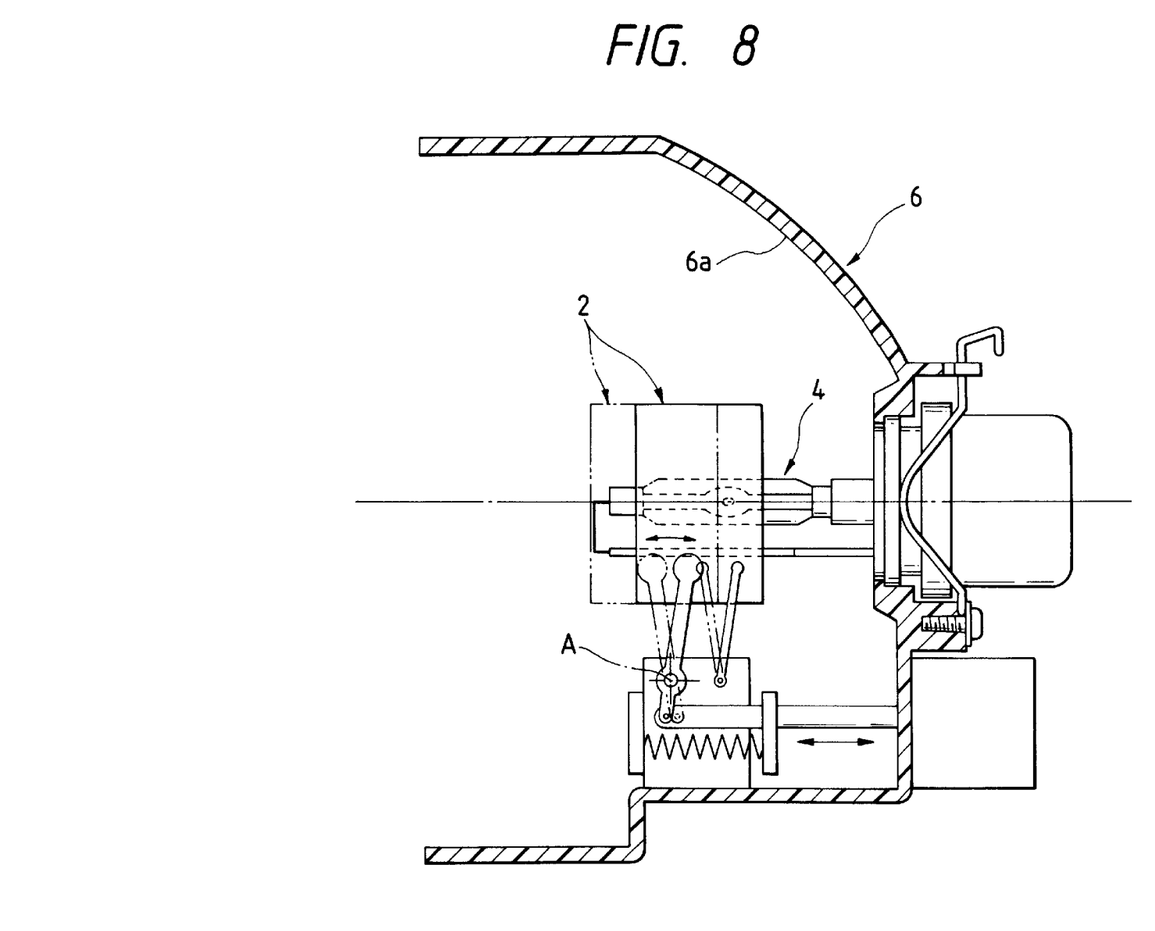
FIG. 8 is a diagram illustrating a conventional vehicle headlamp of the sort shown in FIG. 1.

In this vehicle headlamp, a light distribution pattern for the low beam is formed by shading part of light incident on the reflective surface 6a of a reflector 6 from a light source bulb 4 when the shade 2 is positioned as shown by a solid line in FIG. 8, whereas a light distribution pattern for the high beam is formed by reducing the shading quantity of light incident on the reflective surface 6a by the shade 2 when the shade 2 is pivoted forward and positioned as shown by a chain double-dashed line therein.

When the beam switching is conducted by mechanically driving the shade 2 as mentioned above, however, the shade 2 tends to produce a backlash in the low- or high-beam forming position because the clearance or backlash is inevitably produced in the mechanical coupling portion. If this sort of backlash occurs, the shade 2 will deflect (generate minute vibrations) because of vibrations during the travel of a vehicle and this may vary the area of the reflective surface 6a shielded by the shade 2. Therefore, the problem is that a light distribution pattern different from the intended light distribution pattern is formed in both cases of low and high beams.

SUMMARY OF THE INVENTION

An object of the present invention was made in view of the situation above to provide a vehicle headlamp arranged so as to switch beams between low and high beams by moving a shade whereby to prevent its light distribution pattern from deviating from the intended light distribution pattern caused by deflection of the shade.

The above object of the present invention is accomplished by arranging a predetermined displacement regulating means.

According to the present invention, a vehicle headlamp comprises: a light source bulb, a reflector having a reflective surface for emitting a predetermined beam forward by reflecting light from the light source bulb, a shade capable of shading part of light incident on the reflective surface from the light source bulb, and a beam switching device for selectively switching beams between low and high beams by moving the shade between two positions where the amount of shielding the shade relative to light incident on the reflective surface has different values, and is characterized in that displacement regulating member is provided so as to regulate the displacement of the shade from the position by making contact with the shade while the shade is located in one of low- and high-beam forming positions.

The aforementioned 'light source bulb' is not limited to a specific kind of light source bulb but may be a halogen lamp, a discharge bulb or the like that is adoptable.

The aforementioned 'beam switching device' is not limited to a specific form as long as the shade is made movable between the two positions. For example, its driving source may be a solenoid, a motor or the like that is adoptable. Further, the power transmission mechanism may be a link mechanism, a gear train or the like that is also adoptable.

The aforementioned 'displacement regulating member' is not limited to a specific form as long as it is capable of regulating the displacement of the shade by contact with the shade located in the low- or high-beam forming positions.

With the arrangement above, though the vehicle headlamp according to the present invention is so constructed as to switch beams between the low and high beams by moving the shade, the displacement of the shade is regulated by bringing the displacement regulating member in contact with the shade located in the low- or high-beam forming position. The backlash of the shade located in the low- or high-beam forming position can thus be prevented whereby to prevent its light distribution pattern from deviating from the intended light distribution pattern.

The aforementioned 'displacement regulating member' may be such that it is brought into contact with the shade in one of the low- and high-beam forming positions. However, the light distribution pattern is prevented from deviating from the intended light distribution pattern in both cases of low and high beams on condition that the displacement regulating member is allowed to contact the shade in both positions.

Although the 'beam switching device' is not limited to a specific form as mentioned above, the provision of the beam switching device includes a solenoid and an elastic member for urging the movable iron core of the solenoid toward a non-excitation position, wherein the low beam is switched to the high beam by exciting the movable iron core and wherein the high beam is switched to the low beam by releasing the movable iron core from being excited ensures beams switching with a simple construction. Moreover, the elastic member may be utilized as part of means for regulating displacement in the direction of moving the shade located in the low-beam forming position by allowing the urging force for urging the movable iron core toward the non-excitation position to remain in the elastic member even when the shade is located in the low-beam forming position.

With the arrangement above, though the direction of moving the shade at the time of beam switching is not specifically restricted, the area of the reflective surface shielded by the shade can be varied with a small shade movement by pivoting the shade longitudinally so as to switch the beams. Consequently, it is possible to switch the beams efficiently and to arrange a simple power transmission mechanism in the beam switching device.

Although the 'displacement regulating member' is not limited to a specific form as mentioned above, since the area of the reflective surface shielded by the shade will vary greatly if the shade is deflected longitudinally because of vibrations during the travel of a vehicle, the displacement regulating member preferably has a low- or high-beam longitudinal displacement regulating structure for regulating the longitudinal displacement of the shade located in the low- or high-beam forming position. In the case of the low beam in particular, such an arrangement as mentioned above is very effective as the longitudinal deflection of the shade directly affects an increase or a decrease in the glare.

On the other hand, the lateral deflection of the shade affects the light distribution less than the longitudinal deflection thereof and the displacement regulating member preferably has a lateral displacement regulating structure for regulating the lateral displacement of the shade located in one of the low- or high-beam forming positions in view of ensuring light distribution performance, as well as preventing the shade from being damaged.

In this case, while the aforementioned lateral displacement regulating structure may be intended to regulate the lateral displacement of the shade located in one of the low- and highbeam forming positions, the lateral displacement regulating structure is preferably so arranged as to regulate the lateral displacement of the shade in both positions. Further the lateral displacement regulating structure is so arranged as to regulate the lateral displacement of the shade not only in the low- or high-beam forming positions but also over the whole moving range of the shade, whereby even though the shade is moved to the low- or high-beam forming position any number of times when the beam switching is repeated, the lateral displacement regulating structure can easily be maintained in such a relation as to regulate the lateral displacement of the shade in that position.

With the arrangement above, further, the displacement regulating member has a displacement regulating block which is located close to and in a diagonal backward direction with respect to the pivotal longitudinal axis of the shade with the result that the following operation/working-effect is achievable.

Since the displacement regulating block is located close to and in the diagonal backward direction with respect to the pivotal longitudinal axis of the shade, the displacement of the shade located in the low- and high-beam forming positions can be regulated by only one displacement regulating block using its edge face. As the displacement regulating block is disposed close to the pivotal longitudinal axis, the displacement regulating structure can be made compact and as the movement of the edge face of the shade in contact with the displacement regulating block is smaller, the impact force and the striking sound at the time of contact can be suppressed.

DETAILED DESCRIPTION OF THE PREFERRED EMBODIMENTS

An embodiment of the present invention will now be described with reference to the drawings.

Figure 1:
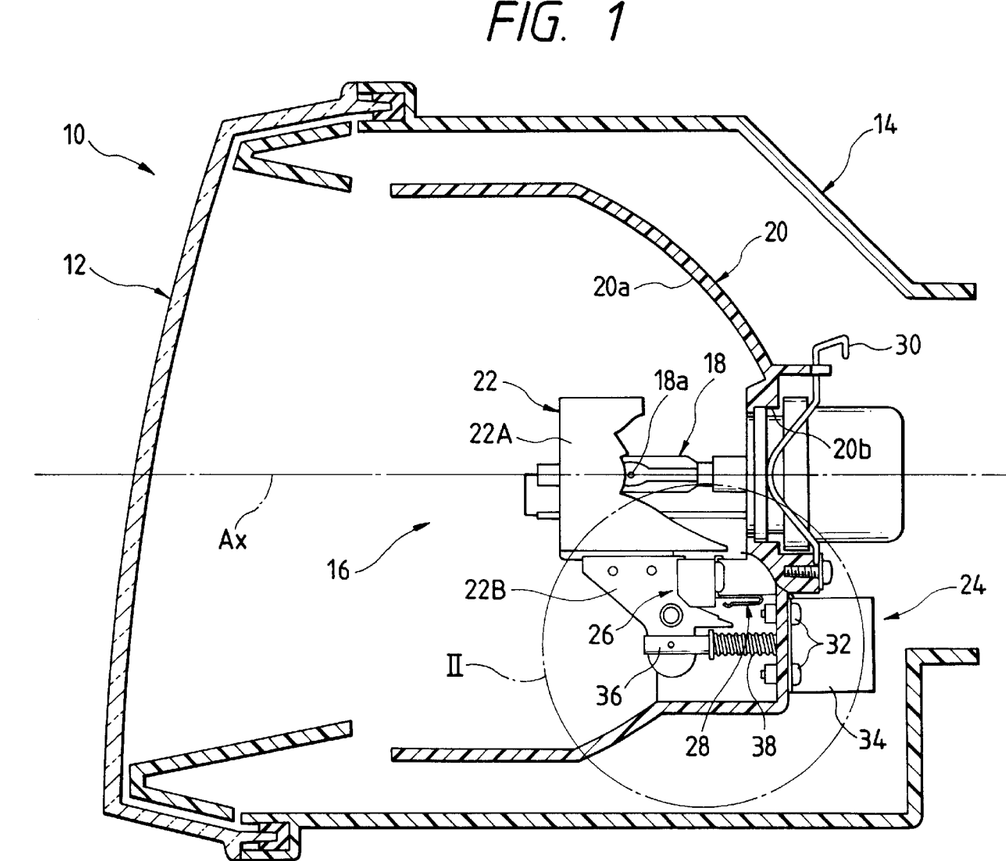
FIG. 1 is a sectional side view of a vehicle headlamp embodying the present invention.
Figure 2:
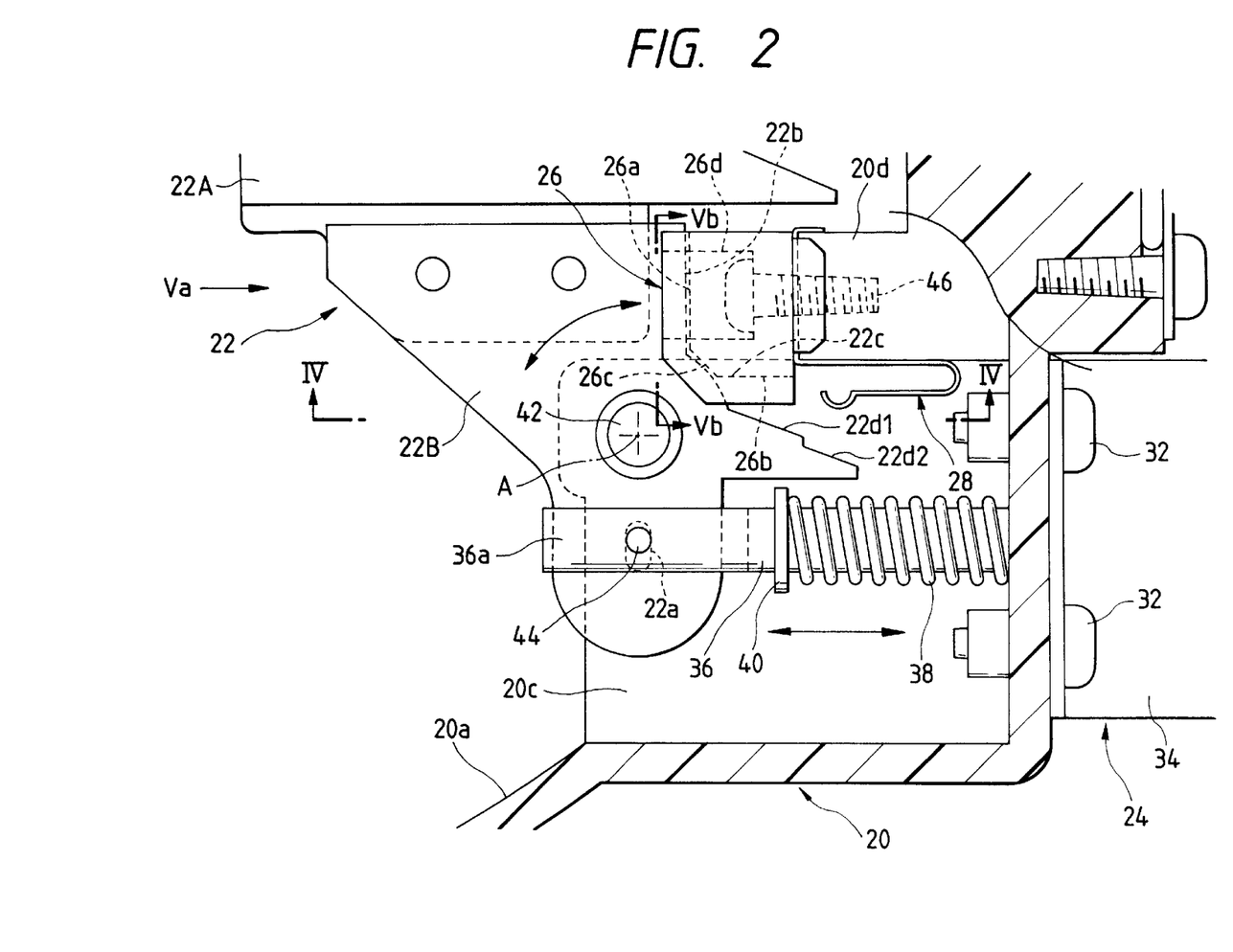
FIG. 2 is a detailed view of a portion II in FIG. 1.

FIG. 1 is a sectional side view of a vehicle headlamp embodying the present invention; and FIG. 2, a detailed view of its portion II.

As shown in FIG. 1, a vehicle headlamp 10 according to this embodiment of the present invention includes a reflector unit 16 that is tiltable vertically and laterally via an aiming mechanism (not shown) and provided in a space formed with a lens 12 and a lamp body 14.

The reflector unit 16 essentially consists of a discharge bulb (metal halide bulb) 18, a reflector 20, a shade 22, a beam switching device 24, a displacement regulating block 26 (displacement regulating means) and a displacement regulating spring (displacement regulating means) 28.

The lens 12 is a plain-glass lens, and the reflector unit 16 has a light-distribution control function. More specifically, the reflector 20 has a reflective surface 20a for reflecting light from the discharge light emitting part (a light source) 18a of the discharge bulb 18 forward, so that the diffusion or deflection reflective function of the reflective surface 20a causes beams for forming a predetermined light distribution pattern to be emitted forward.

The discharge bulb 18 is inserted into a rear top opening 20b in order that its discharge light emitting part 18a may be positioned on the optical axis Ax of the reflector 20, and fixed to the reflector 20 by means of a wire spring 30.

The shade 22 is formed with a cylindrical shade body 22A whose rear end edge is formed into a complicated uneven shape, and a plate-like stay 22B slightly extending rearward and also downward from the lower end portion of the shade body 22A, the shade body 22A and the stay 22B being riveted together.

Figure 3A:
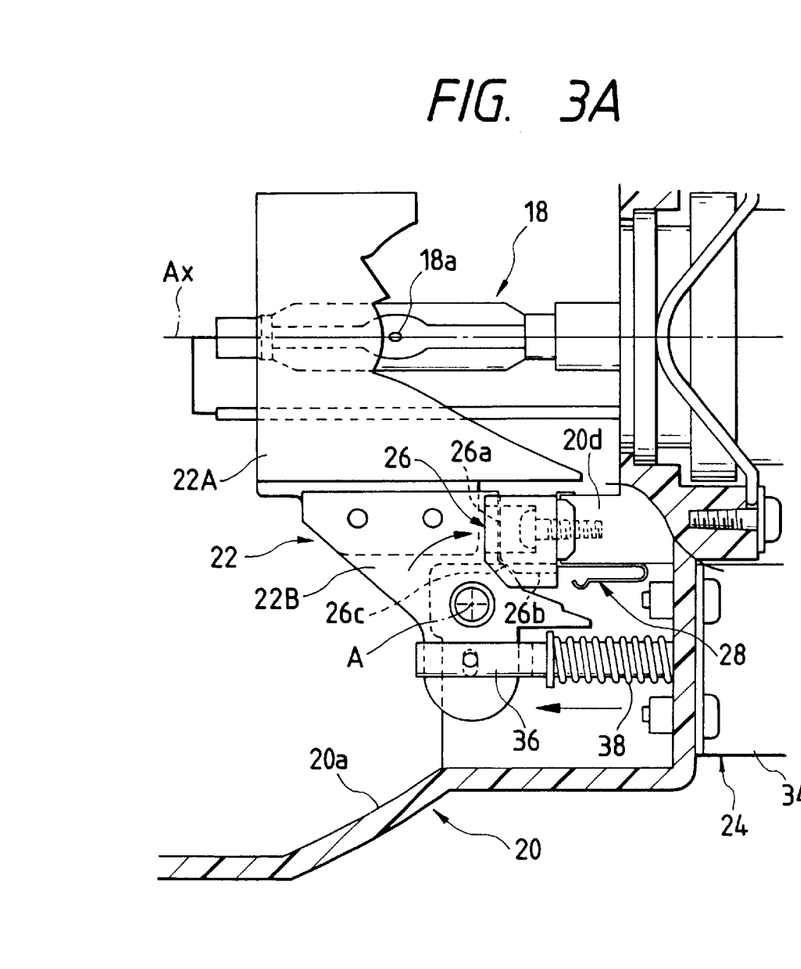
FIG. 3A is a sectional side view showing the operation of the aforementioned embodiment of the invention in a low beam state.
Figure 3B:
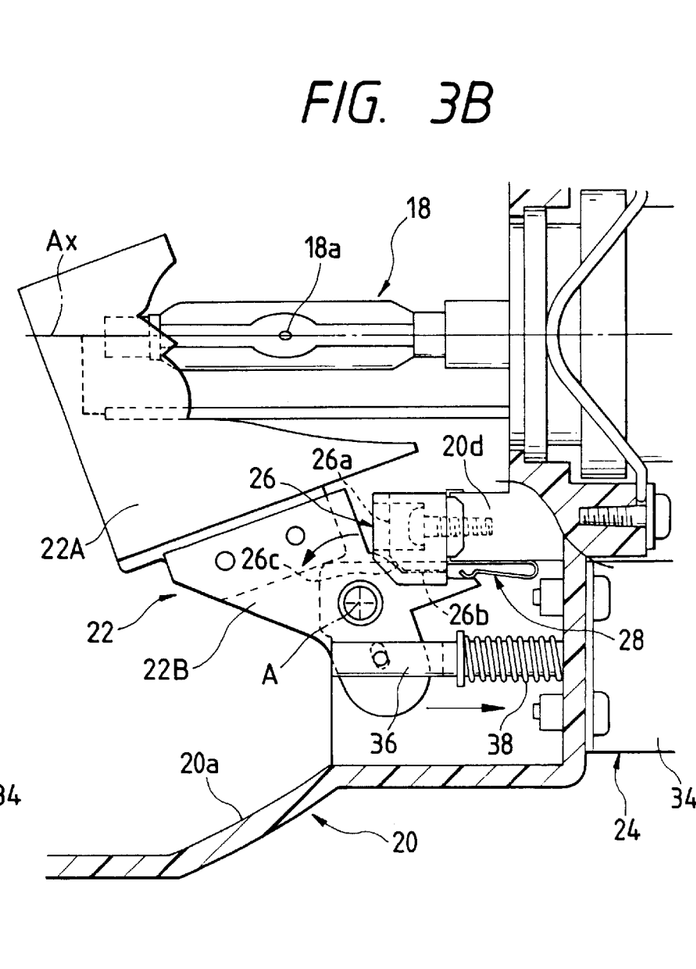
FIG. 3B is a sectional side view showing the operation of the aforementioned embodiment of the invention in a high beam state.

As will be described below, the beam switching device 24 allows the shade 22 to take the low-beam forming position shown in FIG. 3A and the high-beam forming position shown in FIG. 3B. In the low-beam forming position, the shade body 22A of the shade 22 screens part of light incident on the reflective surface 20a of the reflector 20 from the discharge light emitting part 18a of the discharge bulb 18 and makes only light necessary for low beam emission incident on the reflective surface 20a. On the other hand, the quantity of light necessary for high beam emission is secured by reducing the quantity of screening light made incident on the reflective surface 20a by the shade body 22A.

As shown in FIG. 2, the beam switching device 24 includes a solenoid 34 fixed by screws 32 to a region below the optical axis Ax of the reflector 20 and a return spring (elastic member) 38 for urging the movable iron core 36 of the solenoid 34 toward its non-excitation position. An E-ring 40 abutting against the front end portion of the return spring 38 to receive the urging force of the return spring 38 is fitted to the intermediate portion of the movable iron core 36.

Further, the leading end portion 36a of the movable iron core 36 is laterally forked. The inner diameter of the return spring 38 is set substantially equal to the outer diameter of the movable iron core 36.

The shade 22 is pivotally supported, in the intermediate portion of its stay 22B, around a longitudinal axis extending laterally, by a lateral pair of vertical walls 20c formed in a region below the optical axis Ax of the reflector 20 via a shaft member 42. The leading end portion (lower end portion) of the stay 22B is coupled via a pin 44 to the leading end portion 36a of the movable iron core 36 in such a way that the leading end portion of the stay 22B is clamped from both sides with the laterally forked end portion 36a of the movable iron core 36, and the pin 44 is laterally passed therethrough. At this time, the pin 44 is fixed to the leading end portion of the movable iron core 36. A slot 22a that is extended vertically and used to receive the pin 44 therethrough is formed in the leading end portion of the stay 22B whereby to absorb a variation in the distance between the shaft member 42 and the pin 44 as the shade 22 pivots.

A region of the rear edge face of the stay 22B above the longitudinal axis A is formed as a vertical face 22b, and another region below the vertical face 22b is formed as an arcuate face 22c around the longitudinal axis A. A region below the arcuate face 22c is formed into a first and a second inclined plane 22d1 and 22d2 extending back obliquely downward and stepwise.

Switching beams between the low and high beams is carried out by the beam switching device 24 as follows:

When the beam changeover switch (not shown) of the beam switching device 24 is off, the movable iron core 36 of the solenoid 34 is in the non-excitation state. Consequently, the movable iron core 36 is moved forward because of the urging force of the return spring 38 and the shade 22 is pivoted backward around a longitudinal axis A up to a position where the shade 22 is brought into contact with the front edge face of the displacement regulating block 26, and fixed to the low-beam forming position shown in FIG. 3A. On the other hand, the movable iron core 36 is moved backward when the beam changeover switch is turned on, thus causing the movable iron core 36 of the solenoid 34 to be excited, and the shade 22 is pivoted forward around the longitudinal axis A up to a position where the shade 22 is brought into contact with the lower edge face of the displacement regulating block 26, and fixed to the high-beam forming position shown in FIG. 3B.

Even though the beam changeover switch is held ON, the movable iron core 36 is placed in the non-excitation state when power supply to the solenoid 34 is cut off because of power failure such as the breaking down of a wire. Consequently, the movable iron core 36 is moved up to the non-excitation position because of the urging force of the return spring 38 and the beam is switched to the low beam. Even when the beam changeover switch is operated then, the low beam is maintained in this case as no power is supplied to the solenoid 34.

The structure of the displacement regulating block 26 and the periphery of the displacement regulating spring 28 will now be described.

Figure 4:
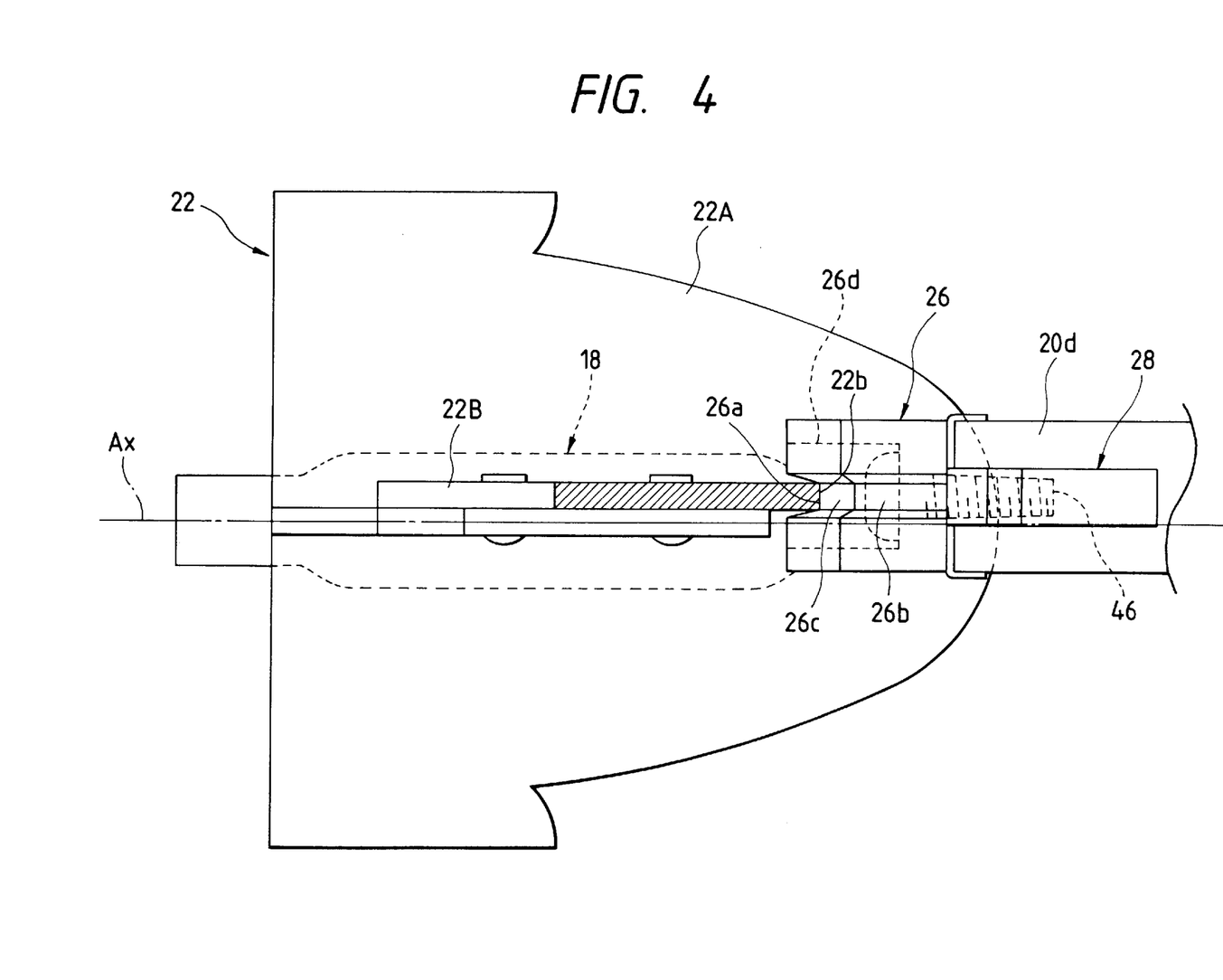
FIG. 4 is a sectional view taken on line IV—IV of FIG. 2.
Figure 5A:
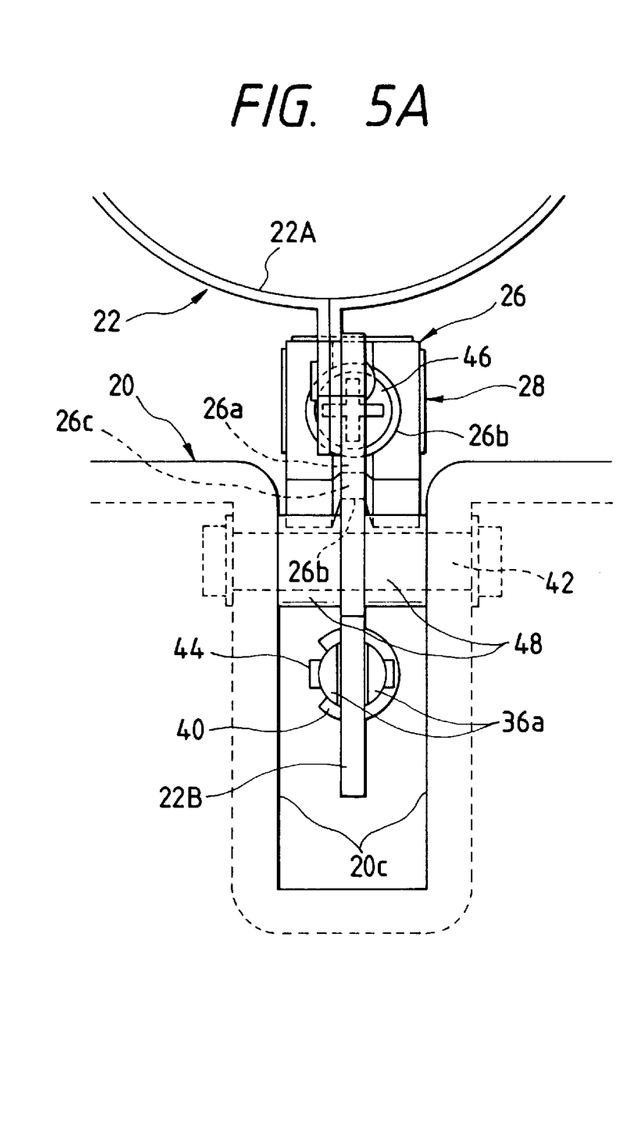
FIG. 5A is a view from an arrow Va of FIG. 2.
Figure 5B:
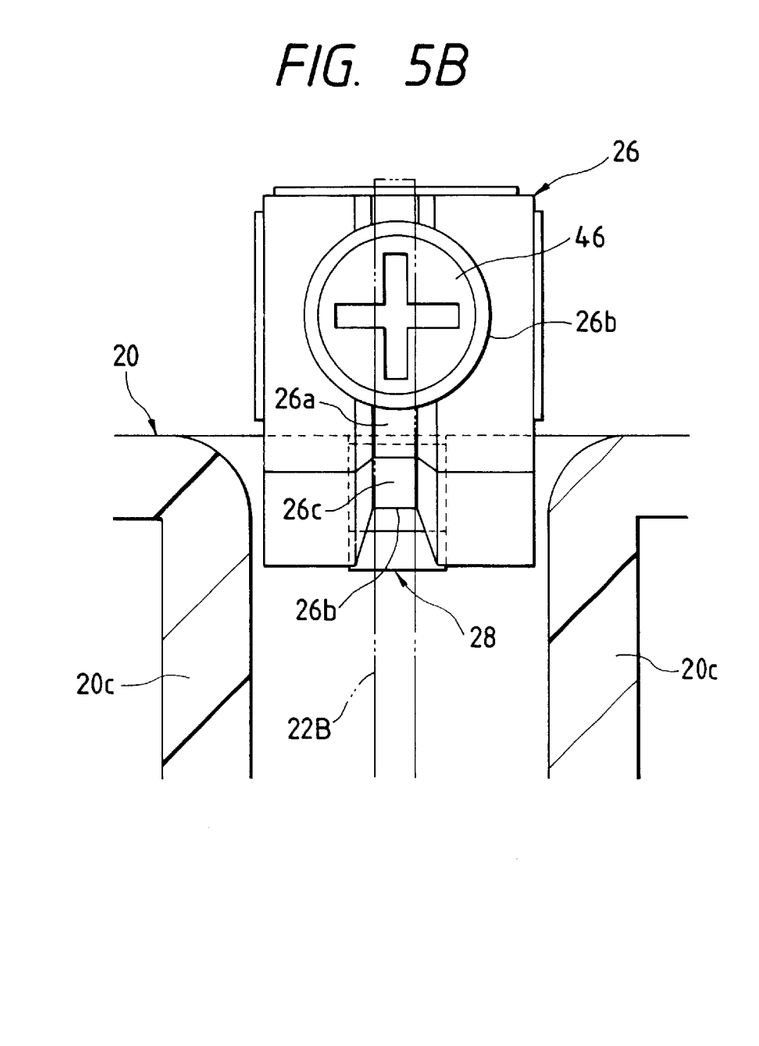
FIG. 5B is a detailed sectional view taken on line Vb—Vb of FIG. 2.

FIG. 4 is a sectional view taken on line IV—IV of FIG. 2; FIG. 5A, a view from an arrow Va of FIG. 2; FIG. 5B, a detailed sectional view taken on line Vb—Vb of FIG. 2; and FIG. 6, a perspective view of the displacement regulating block 26 and the displacement regulating spring 28 as seen obliquely from their lower front sides.

As shown in the drawings, the displacement regulating block 26 is tightened and fixed to a projected portion 20d with a screw 46 from the front side via the displacement regulating spring 28, the projected portion 20d being formed in the region below the optical axis Ax of the reflector 20, and is located close to and in the upper diagonal backward direction of the shaft member 42 (upper right in FIG. 2). The displacement regulating block 26 for use is a member made of resin (e.g., Teflon resin) in order to suppress the generation of a striking sound when the shade 22 is brought into contact with the displacement regulating block 26. If necessary, the contact face of the displacement regulating block 26 relative to the shade 22 may be covered with rubber or the like.

Figure 6:
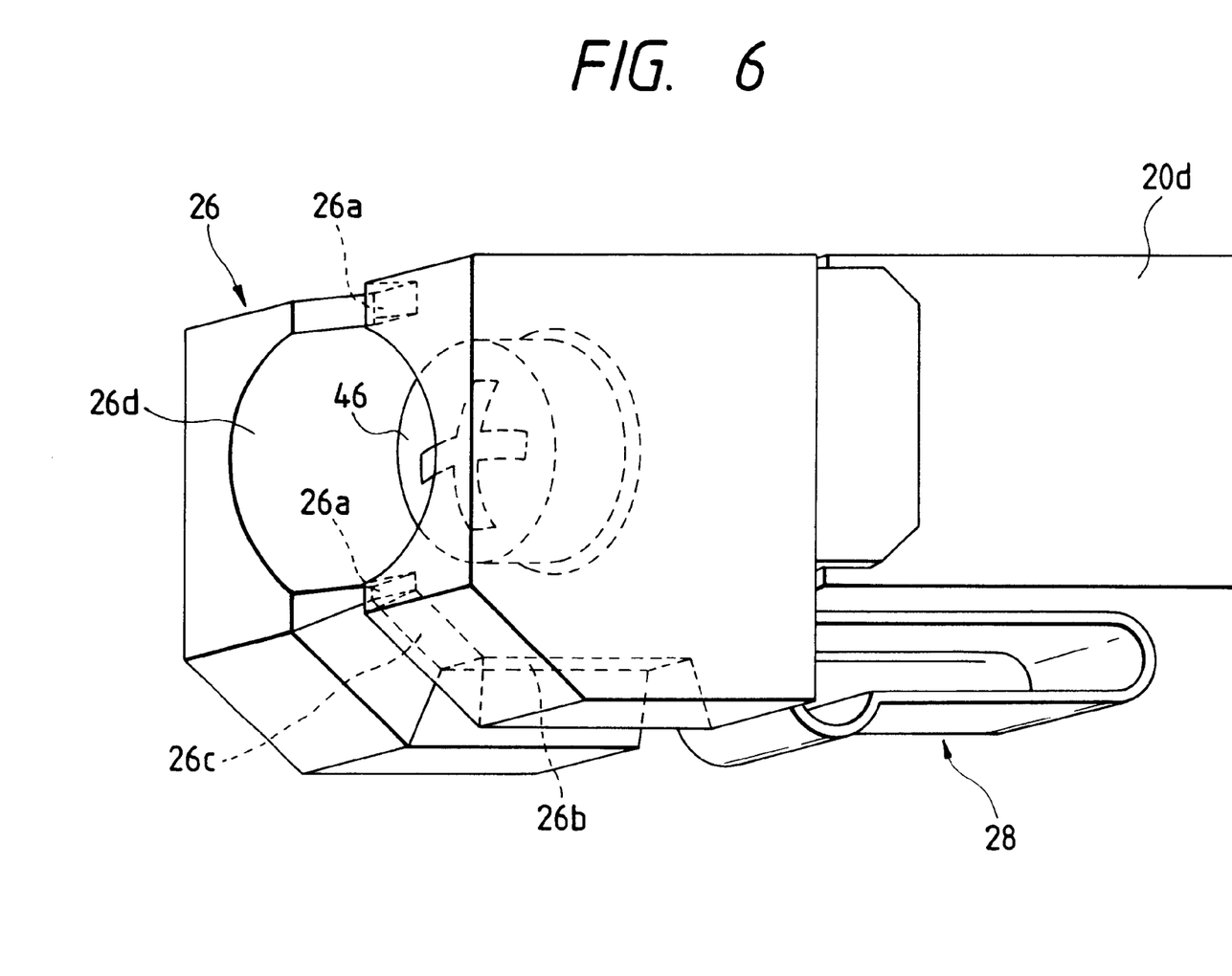
FIG. 6 is a perspective view of a displacement regulating block and a displacement regulating spring as seen obliquely from their lower front sides.

A V-groove 26a extending in the vertical direction is formed in the front edge face of the displacement regulating block 26; a V-groove 26b extending in the longitudinal direction is formed in the lower edge face of the displacement regulating block 26; and a V-groove 26c extending in the direction of the inclined planes is formed in the inclined planes in the boundary portion between the front edge face and lower edge face of the displacement regulating block 26. These V-grooves 26a, 26b and 26c are trapezoidal in cross section and continuously formed with a base width substantially equal to the plate thickness of the stay 22B within the same vertical face as that of the stay 22B of the shade 22. Moreover, a screw imbedding hole 26d is provided for preventing the head of the screw 46 from protruding from the base of the V-groove 25a.

The contact between the shade 22 and the displacement regulating block 26 in the low-beam forming position is made by bringing the vertical face 22b of the stay 22B into contact with the base of the V-groove 26a. This contact is established in such a state that the elastic urging force of the return spring 38 for use in urging the movable iron core 36 toward the non-excitation position still exists. It is thus ensured that the contact between the shade 22 and the displacement regulating block 26 in the low-beam forming position is maintained. On the other hand, the contact between the shade 22 and the displacement regulating block 26 in the high-beam forming position is made by bringing the first inclined plane 22d1 into contact with the base of the V-groove 26b. In this case the arcuate face 22c of the stay 22B is set usually contiguous to the base of the V-groove 26c of the displacement regulating block 26 irrespective of the pivoting position of the shade 22.

The lateral displacement of the stay 22B is regulated by both the side wall surfaces of the V-groove 26a in the low-beam forming position and regulated by both the side wall surfaces of the V-groove 26b in the high-beam forming position and also regulated by both the side wall surfaces of the V-groove 26c over the whole pivoting range of the shade 22.

The displacement regulating spring 28 is a plate spring that is fitted to the front end portion of the projected portion 20d of the reflector 20 and extended in a substantially U-shape along the underside of the projected portion 20d. When the shade 22 pivots from the low-beam forming position to the high-beam forming position, it makes contact with the second inclined plane 22d2 of the stay 22B and undergoes elastic deformation because of the contact therewith. Further, the displacement regulating spring 28 urges the stay 22B downward with its elastic force after the shade 22 pivots up to the high-beam forming position. The provision of the displacement regulating spring 28 is intended to prevent the useless striking sound at the time of beam switching between the low and high beams without causing the stay 22B to make contact with the displacement regulating block 26 with great force. Moreover, the backlash of the coupling portion between the stay 22B and the shaft member 42, the backlash of the coupling portion between the stay 22B and the movable iron core 36 of the solenoid 34 and the backlash of the movable iron core 36 itself are absorbed by causing the elastic urging force of the displacement regulating spring 28 to act on the stay 22B so as to resist against the exciting force of the solenoid 34.

In this embodiment of the invention, spacers 48 are as shown in FIG. 5A fitted in between the stay 22B and the lateral pair of vertical walls 20c of the reflector 20 respectively so as to minimize the backlash of the coupling portion between the stay 22B and the shaft member 42.

The operation/working-effect of this embodiment of the present invention will now be described.

If the shade body 22A of the shade 22 is deflected longitudinally or laterally because of vibrations while a vehicle is running, the area of the reflective surface 20a shielded by the shade body 22A will vary greatly, which will cause the light distribution pattern to deviate from the intended light distribution pattern of the low or high beam. In the case of the low beam in particular, the deviation of the light distribution pattern may directly affect an increase or a decrease in the glare.

When the shade 22 is in the low- and high-beam forming positions in the vehicle headlamp 10 according to this embodiment of the invention, the displacement regulating block 26 is brought into contact with the stay 22B of the shade 22 in the V-grooves 26a and 26b in such a way as to laterally hold the stay 22B. As the displacement of the stay 22B of the shade 22 in its pivotal and lateral directions is thus regulated, the backlash of the shade 22 is prevented in its low- and high-beam forming positions. Thus, the light distribution patterns in both cases of low and high beams are prevented from deviating from the intended light distribution patterns, and the possibility that the shade 22 is damaged can be obviated. Even though the shade 22 slightly tilts laterally when pivoting, further, the side wall surfaces of the V-groove 26a or 26b is brought into contact with and can be used to guide the stay 22B up to the low- or high-beam forming position.

Since the displacement regulating block 26 is located in the upper diagonal backward direction of the shaft member 42, moreover, the displacement regulating block 26 can be used simultaneously as a structure of regulating the displacement of the shade 22 in the low- and high-beam forming positions. Since the displacement regulating block 26 is located close to the shaft member 42, the structure of regulating the displacement thereof can be made compact. As the movements of the vertical face 22b of stay 22B in contact with the displacement regulating block 26 and the inclined plane 22d1 are smaller, the impact force and the striking sound at the time of contact can be suppressed. Further, since the contact between the displacement regulating block 26 and the stay 22B is not a point-to-point contact but what has a certain length in the V-grooves 26a and 26b, the impact force and the striking sound at the time of contact can also be suppressed.

According to this embodiment of the invention, the lateral displacement of the shade 22 is regulated by the V-groove 26c of the displacement regulating block 26 over the whole pivoting range of the shade 22 to ensure that the stay 22B can be guided into the V-groove 26a or 26b at the time of beam switching.

According to this embodiment of the invention, the beam switching device 24 is provided with the return spring 38 for urging the solenoid 34 and the movable iron core 36 toward the non-excitation position whereby to switch the beams with a simple construction. Moreover, the contact between the shade 22 and the displacement regulating block 26 in the low-beam forming position is made while the elastic urging force of the return spring 38 still exists to ensure that the contact between the shade 22 and the displacement regulating block 26 is maintained. On the other hand, as the elastic urging force of the displacement regulating spring 28 acts on the stay 22B so as to resist against the exciting force of the solenoid 24, the backlash of the shade 22 in its pivoting direction can be prevented.

According to this embodiment of the invention, further, since the shade 22 is pivoted in the longitudinal direction to switch the beams, the area of the reflective surface 20a shielded by the shade 22 can be varied with the smaller movement of the shade 22. Therefore, it is possible to switch the beams efficiently and to arrange a simple power transmission mechanism in the beam switching device 24.

According to this embodiment of the invention, the return spring 38 and the movable iron core 36 have substantially equal diameters and are provided on the same axle, whereby the space can be utilized effectively without being obstructed by other members. The provision of the return spring 38 and the movable iron core 36 that have substantially equal diameters and provided on the same axle makes it possible to transfer the urging force of the return spring 38 to the movable iron core 36 with efficiency.

Figure 7:
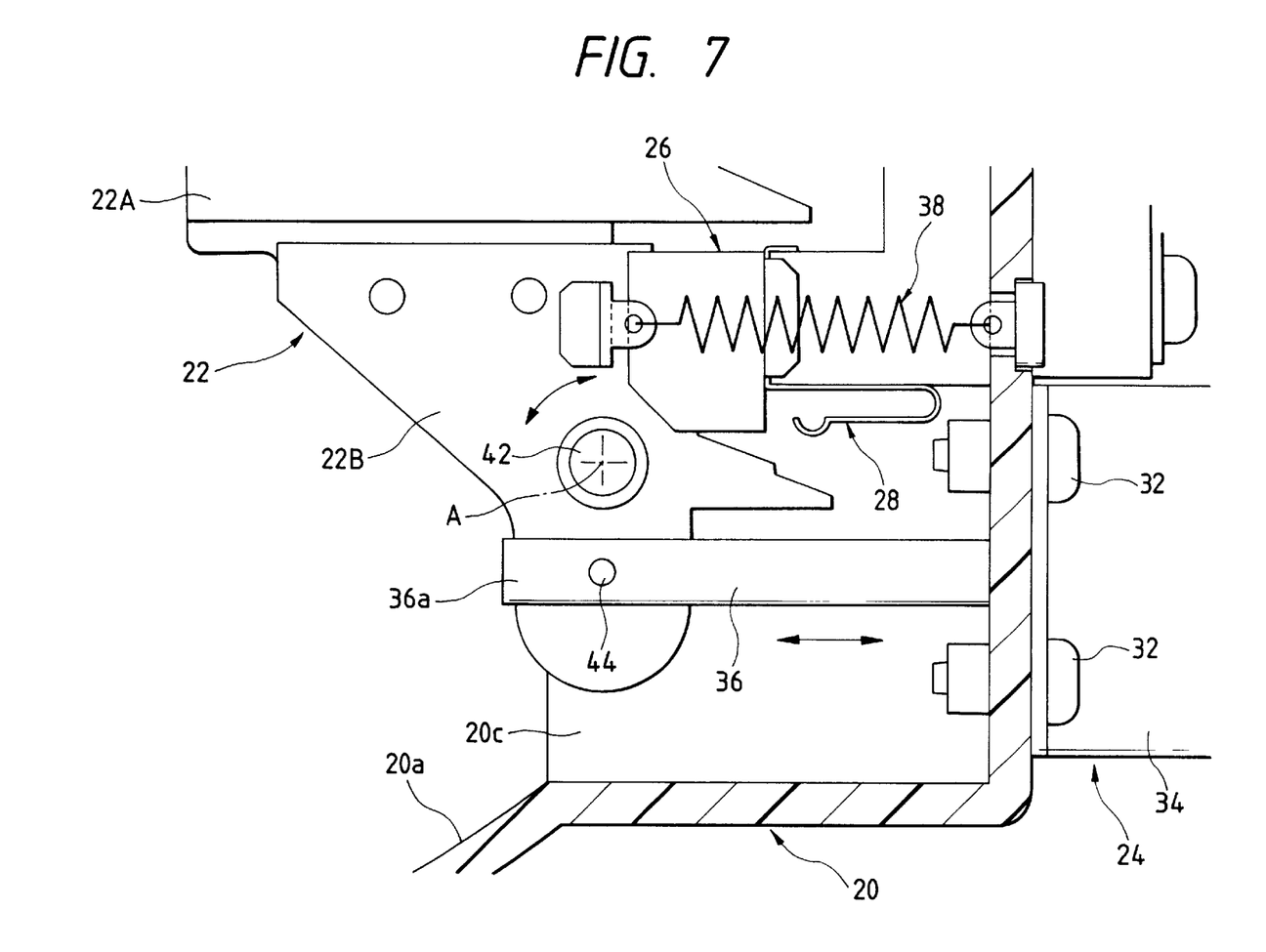
FIG. 7 is a diagram illustrating a modified example of the embodiment of the present invention as shown in FIG. 2.

Instead of the arrangement above, the return spring 38 may be replaced with an extension spring that is provided in a position apart from the movable iron core 36 as shown in FIG. 7. Even in this case, working effect similar to what has been described in the aforementioned embodiment of the invention can be achieved with respect to regulating the displacement of the shade by means of the displacement regulating block 26 and the displacement regulating spring 28.

Further, though the shade 22 has been so arranged as Sit to be pivoted longitudinally by the beam switching device 24 according to the aforementioned embodiment of the invention, working effect similar to what has been described in the aforementioned embodiment of the invention can be achieved by using suitable displacement regulating means equivalent to the displacement regulating block 26 and the displacement regulating spring 28 even if it is arranged to switch beams by reciprocating the shade 22 longitudinally along the optical axis Ax.

While only a certain embodiments of the invention has been specifically described herein, it will be apparent that numerous modifications may be made thereto without departing from the spirit and scope of the invention.

The present invention is based on Japanese Patent Application No. Hei. 11-6018 which is incorporated herein by reference.

What is claimed is:

1. A vehicle headlamp comprising:
    a light source bulb;
    a reflector including a reflective surface for emitting a predetermined beam forward by reflecting light from said light source bulb;
    a shade for shading a part of light incident on the reflective surface from said light source bulb;
    a beam switching device for selectively switching beams between low and high beams by moving said shade between two positions where the amount of shielding said shade relative to light incident on said reflective surface has different values; and a displacement regulating member for regulating the displacement of said shade from one of low- and high-beam forming positions by making contact with said shade while said shade is located in the one of the low- and high-beam forming positions, wherein said displacement regulating member includes at least one groove which engages with said shade in order to regulate the displacement of said shade.

2. The vehicle headlamp according to claim 1, wherein said beam switching device includes a solenoid having a movable iron core and an elastic member for urging the movable iron core of said solenoid toward a non-excitation position, the low beam is switched to the high beam by exciting said movable iron core, and the high beam is switched to the low beam by releasing said movable iron core from being excited.

3. The vehicle headlamp according to claim 2, wherein said elastic member is a return spring having a diameter substantially equal to a diameter of the movable iron core of said solenoid, and both said elastic member and the movable iron core are provided on the same axle.

4. The vehicle headlamp according to claim 2, wherein said elastic member is an extension spring provided in a position apart from the movable iron core of said solenoid, and both said elastic member and the movable iron core are provided on different axles.

5. The vehicle headlamp according to claim 1, wherein said beam switching device switches beams by pivoting said shade longitudinally.

6. The vehicle headlamp according to claim 1, wherein said displacement regulating member regulates a longitudinal displacement of said shade located in the low-beam forming position.

7. The vehicle headlamp according to claim 1, wherein said displacement regulating member regulates a longitudinal displacement of said shade located in the high-beam forming position.

8. The vehicle headlamp according to claim 6, wherein said displacement regulating member regulates the longitudinal displacement of said shade located in the high-beam forming position.

9. The vehicle headlamp according to claim 1, wherein said displacement regulating member regulates a lateral displacement of said shade located in one of low- and high-beam forming positions.

10. A vehicle headlamp, comprising:

a light source bulb;

a reflector including a reflective surface for emitting a predetermined beam forward by reflecting light from said light source bulb;

a shade for shading a part of light incident on the reflective surface from said light source bulb;

a beam switching device for selectively switching beams between low and high beams by moving said shade between two positions where the amount of shielding said shade relative to light incident on said reflective surface has different values; and a displacement regulating member for regulating the displacement of said shade from one of low- and high-beam forming positions by making contact with said shade while said shade is located in the one of the low- and high-beam forming positions, wherein said displacement regulating member regulates a longitudinal displacement of said shade located in the low-beam forming position, wherein said displacement regulating member regulates a lateral displacement of said shade located in one of low- and high-beam forming positions.

11. A vehicle headlamp, comprising:

a light source bulb;

a reflector including a reflective surface for emitting a predetermined beam forward by reflecting light from said light source bulb;

a shade for shading a part of light incident on the reflective surface from said light source bulb;

a beam switching device for selectively switching beams between low and high beams by moving said shade between two positions where the amount of shielding said shade relative to light incident on said reflective surface has different values; and a displacement regulating member for regulating the displacement of said shade from one of low- and high-beam forming positions by making contact with said shade while said shade is located in the one of the low- and high-beam forming positions, wherein said displacement regulating member regulates a longitudinal displacement of said shade located in the high-beam forming position, wherein said displacement regulating member regulates a lateral displacement of said shade located in one of low- and high-beam forming positions.

12. The vehicle headlamp according to claim 9, wherein said displacement regulating member regulates the lateral displacement of said shade over the whole moving range of said shade.

13. A vehicle headlamp, comprising:

a light source bulb;

a reflector including a reflective surface for emitting a predetermined beam forward by reflecting light from said light source bulb;

a shade for shading a part of light incident on the reflective surface from said light source bulb;

a beam switching device for selectively switching beams between low and high beams by moving said shade between two positions where the amount of shielding said shade relative to light incident on said reflective surface has different values; and a displacement regulating member for regulating the displacement of said shade from one of low- and high-beam forming positions by making contact with said shade while said shade is located in the one of the low- and high-beam forming positions wherein said beam switching device switches beams by pivoting said shade longitudinally, wherein said displacement regulating member includes a displacement regulating block located close to and in a diagonal backward direction with respect to a pivotal longitudinal axis of said shade.

14. The vehicle headlamp according to claim 13, wherein said displacement regulating block is made of Teflon resin.

15. The vehicle headlamp according to claim 13, wherein a contact face of said displacement regulating block relative to said shade is covered with rubber.

16. The vehicle headlamp according to claim 1, wherein said beam switching device switches beams by reciprocating said shade longitudinally along an optical axis of said reflector.

* * * * *